(12) United States Patent
Miller et al.

(10) Patent No.: US 11,272,582 B2
(45) Date of Patent: Mar. 8, 2022

(54) COAXIAL SMART SUSCEPTOR

(71) Applicant: The Boeing Company, Chicago, IL (US)

(72) Inventors: Robert James Miller, Seattle, WA (US); Marc Rollo Matsen, Seattle, WA (US); Cameron Kai-Ming Chen, Seattle, WA (US); Leah Gillian Glauber, Seattle, WA (US); James M. Kestner, Seattle, WA (US); Christopher John Hottes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 16/658,053

(22) Filed: Oct. 19, 2019

(65) Prior Publication Data

US 2020/0053841 A1 Feb. 13, 2020

Related U.S. Application Data

(62) Division of application No. 14/548,045, filed on Nov. 19, 2014, now Pat. No. 10,470,253.

(51) Int. Cl.
| | |
|---|---|
| *H05B 6/10* | (2006.01) |
| *C22C 38/08* | (2006.01) |
| *H05B 6/40* | (2006.01) |
| *H05B 6/06* | (2006.01) |
| *H05B 6/14* | (2006.01) |

(52) U.S. Cl.
CPC ............ *H05B 6/105* (2013.01); *C22C 38/08* (2013.01); *H05B 6/06* (2013.01); *H05B 6/14* (2013.01); *H05B 6/40* (2013.01); *H05B 2206/023* (2013.01); *Y02P 10/25* (2015.11)

(58) Field of Classification Search
CPC ... H05B 6/10; H05B 6/40; H05B 6/44; H05B 6/105; C22C 38/08
USPC ........................................................ 219/634
See application file for complete search history.

(56) References Cited

U.S. PATENT DOCUMENTS

| | | |
|---|---|---|
| 3,996,402 A | 12/1976 | Sindt |
| 4,120,712 A | 10/1978 | Sindt |
| 4,479,163 A | 10/1984 | Bannink, Jr. et al. |
| 5,500,511 A | 3/1996 | Hansen et al. |
| 5,508,496 A | 4/1996 | Hansen et al. |
| 5,573,613 A | 11/1996 | Lunden |

(Continued)

*Primary Examiner* — Ibrahime A Abraham
*Assistant Examiner* — Spencer H. Kirkwood
(74) *Attorney, Agent, or Firm* — McDonnell Boehnen Hulbert & Berghoff LLP

(57) ABSTRACT

A coaxially arranged smart susceptor conductor, comprising a smart susceptor core comprising an alloy having a first Curie temperature point and a first smart susceptor shell coaxially arranged around the smart susceptor core. The first smart susceptor shell comprising a second Curie temperature point that is different than the first Curie temperature point of the smart susceptor core. In one arrangement, the second Curie temperature point of the first smart susceptor shell is lower than the first Curie temperature point of the smart susceptor core. In another arrangement, the smart susceptor conductor further comprises a second smart susceptor shell disposed about the first smart susceptor shell. The second smart susceptor shell comprising a third Curie temperature point.

20 Claims, 7 Drawing Sheets

(56) References Cited

U.S. PATENT DOCUMENTS

| | | | |
|---|---|---|---|
| 5,717,191 A | | 2/1998 | Christensen et al. |
| 5,723,849 A | | 3/1998 | Matsen et al. |
| 5,728,309 A | | 3/1998 | Matsen et al. |
| 5,756,973 A | | 5/1998 | Kirkwood et al. |
| 5,808,281 A | * | 9/1998 | Matsen ................ B21D 26/053 219/634 |
| 6,086,975 A | | 7/2000 | Brick et al. |
| 7,599,164 B2 | | 10/2009 | Heeter et al. |
| 2002/0038687 A1 | | 4/2002 | Anderson et al. |
| 2002/0179688 A1 | | 12/2002 | Sanders |
| 2003/0127172 A1 | | 7/2003 | Georgeson et al. |
| 2010/0021578 A1 | | 1/2010 | Coleman et al. |
| 2011/0229720 A1 | | 9/2011 | Matsen et al. |
| 2012/0145703 A1 | * | 6/2012 | Matsen .................. H05B 6/105 219/618 |
| 2013/0082047 A1 | | 4/2013 | Matsen et al. |
| 2014/0116597 A1 | | 5/2014 | Miller et al. |

\* cited by examiner

COAXIAL SMART SUSCEPTOR

CROSS REFERENCE TO RELATED APPLICATION

The present application is a divisional of U.S. patent application Ser. No. 14/548,045 filed Nov. 19, 2014. The entire disclosure contents of this application is herewith incorporated by reference into the present application.

FIELD

The present disclosure relates generally to smart susceptors for use with heating blankets. More particularly, the present disclosure relates to coaxial smart susceptors for use with heating blankets and method for heating a structure to a substantially uniform temperature across the structure.

BACKGROUND

The reworking of composite structures frequently requires the localized application of heat. When installing a patch in a rework area of a composite structure, heat must typically be applied to the adhesive at the bondline between the patch and rework area in order to fully cure the adhesive. When applying heat to the patch, the temperature of the bondline must typically be maintained within a temperature range that must be held for an extended period of time until the adhesive is cured. Overheating or under heating the rework area or structure located adjacent to the rework area is generally undesirable during the rework process.

Conventional heating equipment for heating composite structures may include heating blankets comprised of electrically resistive heating elements. Variations in the construction of conventional heating blankets may result in differential heating across the rework area. In addition, conventional heating blankets may lack the ability to compensate for heat sinks located adjacent to the rework area. Such heat sinks may comprise various elements such as stiffeners, stringers, ribs, bulkheads and other structural members in thermal contact with the structure. Attempts to provide uniform heat distribution using conventional resistive heating blankets include multi-zone blanket systems, feedback loop systems, positive temperature coefficient heating elements, and temperature stabilizing plugs. Additions of such systems to conventional resistive heating blankets are generally ineffective in providing a substantially uniform temperature without substantial variation across the bondline of the rework area.

As can be seen, there exists a need for a system and method for heating a structure such as a rework area of a composite structure in a manner which maintains a substantially uniform temperature across the rework area. More specifically, there exists a need for a system and method for uniformly heating a composite structure and which accommodates heat drawn from the rework area by heat sinks and other thermal variations located adjacent to the rework area. Furthermore, there exists a need for a system and method for uniformly heating a composite structure in a manner which prevents overheating or under heating of the composite structure. Ideally, such system and method for uniformly heating the composite structure is low in cost and simple in construction. There is also a need for a system that provides for temperature regulation over a broad range of temperatures typically required for composite processing, for example, from about 70° F. to about 350° F.

SUMMARY

According to an exemplary arrangement, a coaxially arranged smart susceptor conductor is disclosed. In one arrangement, the coaxially arranged smart susceptor comprises a smart susceptor core comprising an alloy having a first Curie temperature point and a first smart susceptor shell coaxially arranged around the smart susceptor core. The first smart susceptor shell comprising a second Curie temperature point that is different than the first Curie temperature point of the smart susceptor core.

In one arrangement, the second Curie temperature point of the first smart susceptor shell is lower than the first Curie temperature point of the smart susceptor core.

In another arrangement, the smart susceptor conductor further comprises a second smart susceptor shell disposed about the first smart susceptor shell. The second smart susceptor shell comprising a third Curie temperature point.

In one arrangement, a method for heating a structure using induction heating is disclosed. The method comprising the steps of positioning a coaxial susceptor near a structure; positioning a first conductor near the coaxial susceptor; applying an alternating current to the first conductor; generating a magnetic field in response to the alternating current applied to the first conductor; generating eddy currents that travel circumferentially in the coaxial susceptor in response to the magnetic field generated by the first conductor; and heating the coaxial susceptor as a result of the generated eddy currents so as to heat the structure to a uniform temperature. The method further comprising the step of arranging the coaxial susceptor within the conductor. The method further comprising the step of arranging the coaxial susceptor within alternating conductors of the conductor. The coaxial susceptor may be arranged such that a longitudinal axis of the coaxial susceptor resides substantially perpendicular to an alternating current flowing through the conductor. The method may include the further step of positioning a second conductor near the coaxial susceptor; applying an alternating current to the second conductor; generating a magnetic field in response to the alternating current applied to the second conductor; generating eddy currents in the coaxial susceptor in response to the magnetic field generated by the second conductor; and heating the coaxial susceptor as a result of the generated eddy currents so as to heat the structure to a uniform temperature.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
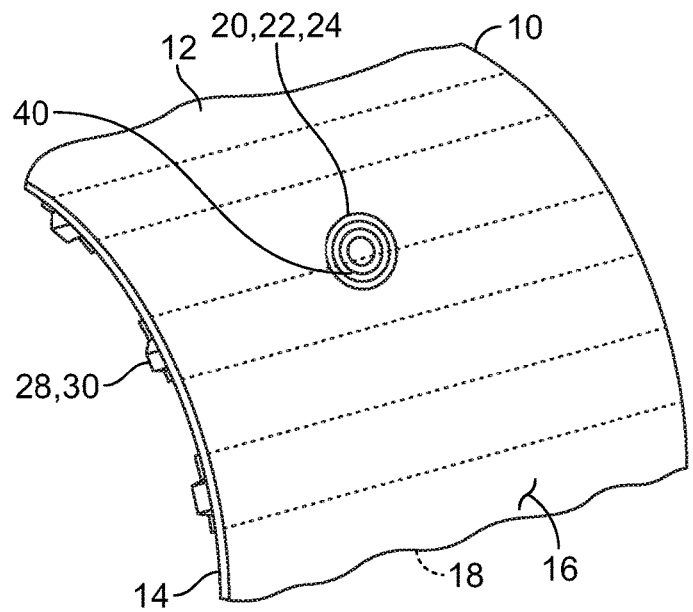
FIG. 1 is a perspective illustration of a composite structure having a rework area formed therein.

Referring now to the drawings wherein the showings are for purposes of illustrating preferred and various embodiments of the disclosure only and not for purposes of limiting the same, shown in FIG. 1 is a perspective illustration of a composite structure 10 upon which a rework process may be implemented using a heating blanket 54 illustrated in FIGS. 2-7. The heating blanket 54 illustrated in FIGS. 2-7 and as disclosed herein may be installed on a patch 40 which may be received within a rework area 20 as illustrated in FIG. 1. The heating blanket 54 as disclosed herein may apply heat to the rework area 20 in order to elevate the temperature of the rework area 20 to a uniform temperature throughout the rework area 20 in order to cure adhesive bonding the patch 40 to the rework area 20 and/or to cure the composite material forming the patch 40. In various embodiments, the heating blanket 54 as disclosed herein incorporates a combination of a plurality of coaxial smart susceptors comprising magnetic materials and high frequency alternating current in order to attain temperature uniformity to a structure 10 to which the heating blanket 54 is applied. In one preferred arrangement, and as will be described in greater detail below, the plurality of coaxial smart susceptors are positioned within a conductor comprising a Litz wire that is wound in a flattened helix (i.e., a solenoid structure). In another preferred arrangement, and as will be described in greater detail below, the plurality of coaxial smart susceptors comprise spring formed coaxial smart susceptors that are positioned around a conductor, such as a Litz wire. Alternative coaxial smart susceptor configurations are also disclosed.

Advantageously, and as will be discussed in greater detail herein, the temperature-dependent magnetic properties such as the Curie temperature of the magnetic materials used in an array of coaxial susceptor wires contained within the heating blanket 54 may prevent overheating or under heating of areas to which the heating blanket 54 may be applied. In addition, the coaxial smart susceptors comprises a core of a first magnetic material and at least one shell provided around this inner core. The at least one shell comprises a magnetic material that has a different Curie temperature than the first magnetic material of the inner core. In this manner, the coaxial smart susceptors of the heating blanket 54 facilitates the uniform application of heat to structures such as composite structures 10 (FIG. 1) during a manufacturing or rework process or any other process where uniform application of heat is required over an enhanced temperature ranges. Importantly, the heating blanket 54 comprising an array of coaxial susceptor wires wherein the coaxial susceptor wire comprises two or more magnetic materials comprising two or more different Curie temperatures provide for a greater temperature regulation over a wider range of temperatures (e.g., from about 70° F. to about 350° F.).

In addition, the heating blanket 54 compensates for heat sinks 28 (FIG. 1) that may draw heat away from portions of a structure 10 (FIG. 1) to which the heating blanket 54 is applied. More specifically, the heating blanket 54 continues to provide heat to portions of the structure 10 located near such heat sinks 28 while areas underneath the heating blanket 54 that have reached or attained the Curie temperature cease to provide heat to the rework area 20.

Figure 2:
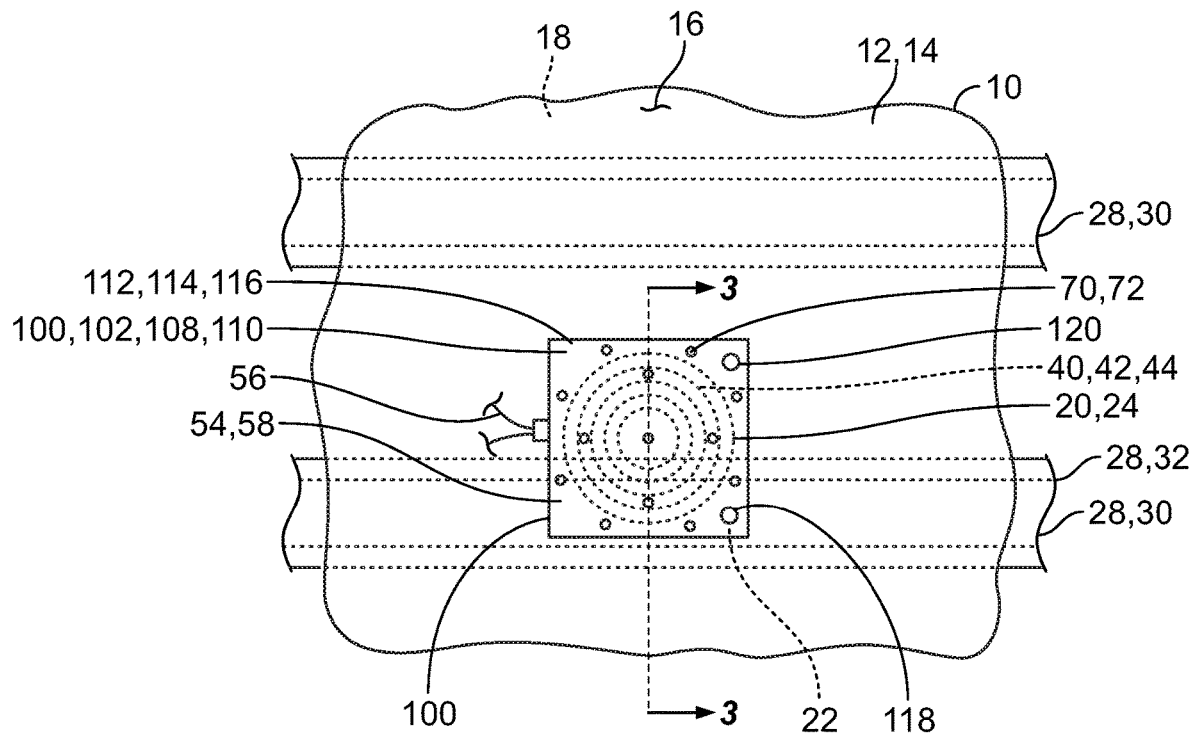
FIG. 2 is a plan view illustration of the rework area of FIG. 1 and illustrating a vacuum bag assembly and a heating blanket applied to the rework area and further illustrating a heat sink comprising a stringer extending along a portion of the rework area on a bottom surfaced of the composite structure.

For example, FIG. 1 illustrates a composite structure 10 which may include a skin 12 formed of plies 14 of composite material and wherein the skin 12 may have upper and lower surfaces 16, 18. The composite structure 10 may include a rework area 20 in the skin 12 formed by the removal of composite material. As can be seen in FIG. 2, the rework area 20 may be formed in the upper surface 16 and may extend at least partially through a thickness of the skin 12 although the rework area 20 may be formed in any configuration through the skin 12. Various structures may be mounted to the lower surface 18 opposite the rework area 20 such as stringers 30 which may act as heat sinks 28 drawing heat away from certain portions of the rework area 20 while the remaining portions continually receive heat from the heating blanket 54 (FIG. 2). Advantageously, the heating blanket 54 (FIG. 2) facilitates the uniform application of heat to the structure 10 by reducing heat input to portions of the rework area 20 that reach approximately the Curie temperature of the magnetic materials in the heating blanket 54 while maintaining a relatively higher level of heat input to portions of the rework area 20 that are below the Curie temperature as will be described in greater detail below.

Figure 3:
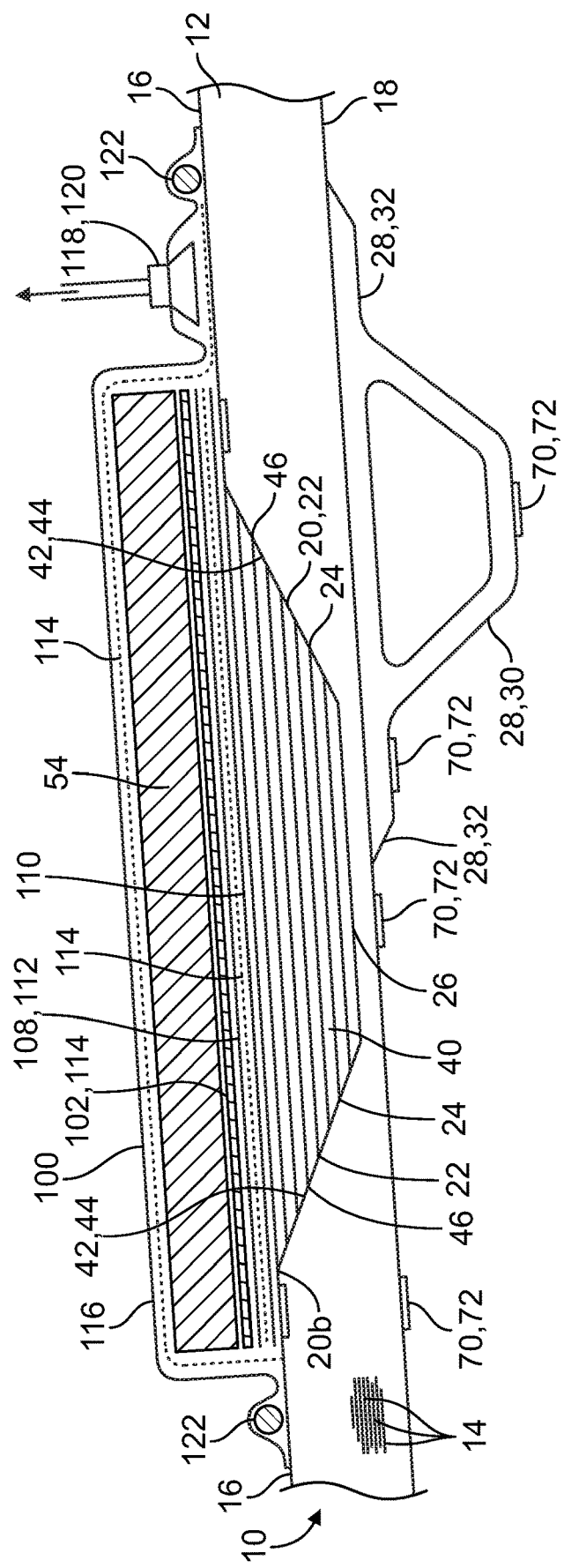
FIG. 3 is a cross-sectional illustration of the composite structure taken along line 3-3 of FIG. 2 and illustrating the stringer (i.e., heat sink) which may draw heat from localized portion of the rework area.

Referring still to FIGS. 2-3, the heating blanket 54 is illustrated as being mounted to the composite structure 10 over the patch 40. A vacuum bag assembly 100 may be installed over the heating blanket 54. The vacuum bag assembly 100 may include a bagging film 116 covering the heating blanket 54 and which may be sealed to the upper surface 16 of the composite structure 10 by means of sealant 122. A vacuum probe 118 and vacuum gauge 120 may extend from the bagging film 116 to a vacuum generator to provide a mechanism for drawing a vacuum on the bagging film 116 for application of pressure and to draw out volatiles and other gasses that may be generated as a result of heating uncured composite material of the patch 40.

As can be seen in FIG. 3, the vacuum bag assembly 100 may include a caul plate 102 positioned above a porous or non-porous parting film 110, 108. The caul plate 102 may facilitate the application of uniform pressure to the patch 40. The porous or non-porous parting film 110, 108 may prevent contact between the caul plate 102 and the patch 40. The vacuum bag assembly 100 may include additional layers such as a bleeder layer 112 and/or a breather layer 114. The patch 40 may be received within the rework area 20 such that a scarf 44 formed on the patch edge 42 substantially matches a scarf 24 formed at the boundary 22 of the rework area 20. In this regard, the interface between the patch 40 and rework area 20 comprises the bondline 46 wherein adhesive is installed for permanently bonding the patch 40 to the rework area 20 and includes adhesive located at the bottom center 26 portion of the rework area 20.

As shown in FIG. 2, thermal sensors 70 such as thermocouples 72 may be strategically located on upper and lower surfaces 16, 18 of the composite structure 10 such as adjacent to the rework area 20 in order to monitor the temperature of such areas during the application of heat using the heating blanket 54. In this regard, thermocouples 72 may be placed on heat sinks 28 such as the stringer 30 body and stringer flanges 32 illustrated in FIG. 3 in order to monitor the temperature of such heat sinks 28 relative to other areas of the composite structure 10.

Figure 4:
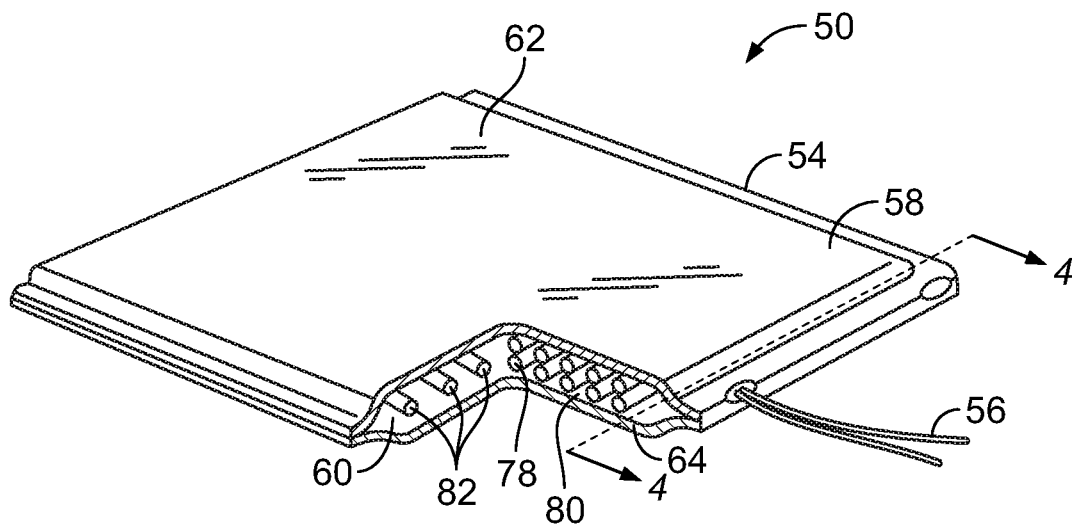
FIG. 4 is a perspective illustration of a heating blanket in an embodiment as may be used for heating the rework area of the composite structure, the heating blanket comprising a flattened helical wire conductor positioned perpendicular to an array of coaxial susceptor wires that are positioned within the flattened helical wire conductor.

FIG. 4 is a perspective illustration of a heating blanket 54 in an embodiment as may be used for heating the rework area of the composite structure. The heating blanket 54 comprising a flattened helical wire conductor 80 and an array of coaxial susceptor wires 82. Preferably, the array of coaxial susceptor wires 82 are arranged within alternating conductors of the helical wire conductor 80 of the heating blanket. More preferably, the array of coaxial susceptor wires are arranged perpendicular to the plurality of conductor portions making up the helical wire conductor 80. In one preferred arrangement, the flattened helical wire conductor 80 comprises a Litz wire that is wound in a flattened helical like structure (e.g., a solenoid) so as to define a plurality of alternating conductors.

Figure 5:
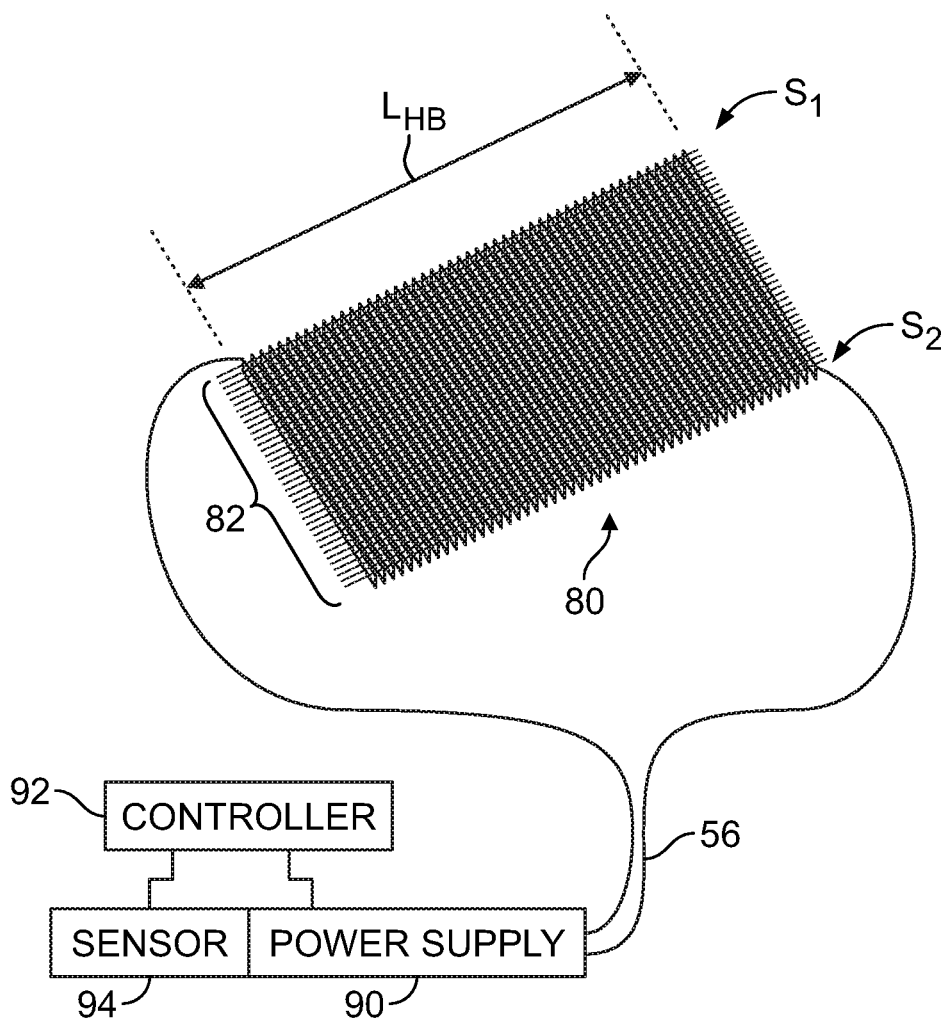
FIG. 5 is a schematic illustration of the heating blanket illustrated in FIG. 4 (with the housing and matrix removed) illustrating the helical wire conductor connected to a power supply, a controller, and a sensor, and with an array of coaxial susceptor wires contained within the helical wire conductor.

For example, FIG. 5 is a schematic illustration of the heating blanket 54 illustrated in FIG. 4 (with the heating blanket housing 58 and matrix 78 removed) so as to illustrate the helical wire conductor 80 connected to a power supply 90, a controller 92, and a sensor 94. As illustrated, the helical wire conductor 80 comprises a unitary wire that winds back and forth between a first side $S_1$ of the heating blanket 54 and a second side $S_2$ of the heating blanket in a flattened helical structure, along a length $L_{HB}$ of the heating blanket 54. Importantly, in this illustrated arrangement of the heating blanket 54, the coaxial susceptor wires 82 are positioned between the alternating conductors or wires making up the helical wire conductor 80 for inductive heating of the array of coaxial susceptor wires 82 in the presence of an alternating current provided by the power source 90. The inductively heated array of coaxial susceptor wires 82 thermally conducts heat to a matrix 78 (FIG. 4). The matrix 78 may thermally conduct heat to a structure 10 to which the heating blanket 54 is mounted (See, e.g., FIGS. 1-3).

Referring to FIGS. 4 and 5, the heating blanket 54 may include a housing defining an interior 60. This interior may be formed of a suitable material which is preferably thermally conductive and which may also be flexible and/or resilient such that the heating blanket 54 may conform to curved areas to which it may be applied. In this regard, the housing 58 is preferably formed of a pliable and/or conformable material having a relatively high thermal conductivity and relatively low electrical conductivity. The housing 58 may comprise upper and lower face sheets 62, 64 formed of silicone, rubber, polyurethane or other suitable elastomeric or flexible material that provides dimensional stability to the housing 58 while maintaining flexibility for conforming the heating blanket 54 to curved surfaces. Although shown as having a generally hollow interior 60 bounded by the upper and lower face sheets 62, 64, the housing 58 may comprise an arrangement wherein the conductor 80 and the associated magnetic material integrated or embedded within the housing 58 such that the conductor 80 is encapsulated within the housing 58 to form a unitary structure 50 that is preferably flexible for conforming to curved surfaces.

FIG. 5 illustrates a perspective view of certain components of the heating blanket 54 showing the flattened helical structure of the conductor 80 and the array of coaxial susceptor wires 82 residing within this helical structure in greater detail. In one preferred arrangement, and as illustrated in FIG. 5, the coaxial susceptor wires 82 are arranged within the helical conductor 80 such that a longitudinal axis of the array of coaxial susceptor wires 82 resides substantially perpendicular to an electrical current flowing through the helical conductor 80. In this manner, the varying magnetic fields generated by the helical conductor 80 induce eddy currents in the array of coaxial susceptor wires 82 as will be discussed in greater detail herein.

A power supply 90 providing alternating current electric power may be connected to the heating blanket 54 by means of the heating blanket wiring 56. The power supply 90 may be configured as a portable or fixed power supply 90 which may be connected to a conventional 60 Hz, 110 volt or 220 volt outlet. Although the power supply 90 may be connected to a conventional 60 Hz outlet, the frequency of the alternating current that is provided to the conductor 80 may preferably range from approximately 1,000 Hz to approximately 400,000 Hz. The voltage provided to the conductor 80 may range from approximately 10 volts to approximately 300 volts but is preferably less than approximately 60 volts. Likewise, the alternating current provided to the conductor 80 by the power supply is preferably between approximately 10 amps and approximately 1000 amps.

Figure 6:
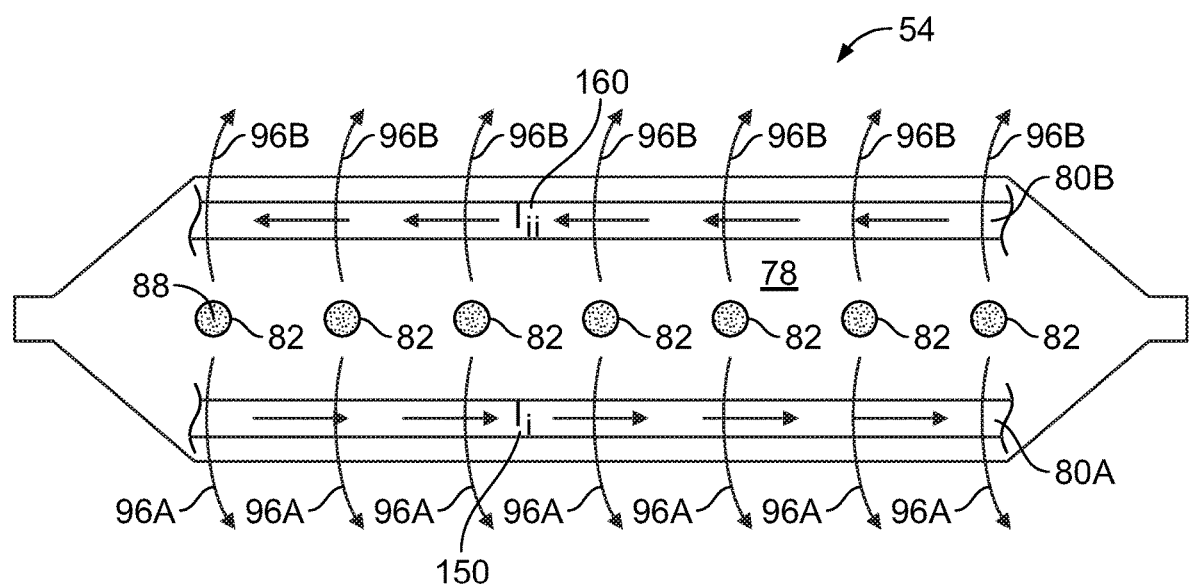
FIG. 6 is a cross-sectional illustration of the heating blanket taken along line 4-4 of FIG. 4 and illustrating the array of coaxial susceptor wires provided within the helical wire conductor for induction heating thereof in response to magnetic fields generated by an alternating current applied to the helical wire conductor.

FIG. 6 illustrates a cross sectional view of the array of coaxial susceptor wires 82 that may be used with the heating blanket 54 illustrated in FIGS. 2-5 taken along line 5-5 of FIG. 5. As illustrated, the array of coaxial susceptor wires 82 comprise a plurality of coaxial susceptor wires 88 that may be loosely bundled together. In one preferred arrangement, at least one of the coaxial susceptor wires 88 within the bundled array of coaxial susceptor wires 82 comprise a susceptor core and at least one susceptor shell that surrounds the susceptor core. In such a bundled configuration, the coaxial susceptor wires 82 are preferably spaced about on the order of 1.2 diameters apart from an adjacent susceptor wire.

Figure 7:
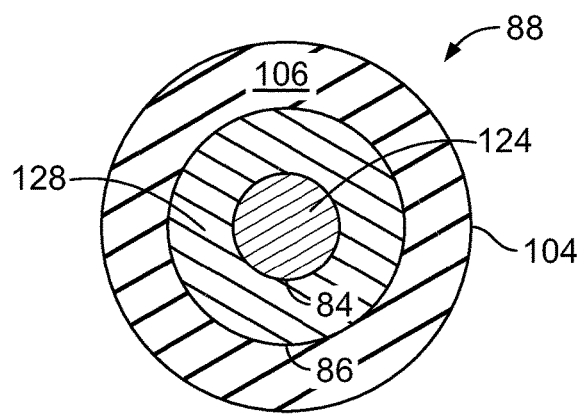
FIG. 7 is a cross-sectional view of one of the plurality of coaxial susceptor wires illustrated in FIG. 6.

For example, FIG. 7 illustrates a cross sectional view of one of the coaxial susceptor wires 88 of the array of coaxial susceptor wires 82 illustrated in FIG. 6. In one arrangement, the coaxial susceptor wire 88 comprises a susceptor core 84 and a susceptor shell 86 surrounding this core 84. Preferably, in one arrangement, the susceptor core 84 comprises a first Curie temperature alloy 124 and the susceptor shell 86 comprises a second Curie temperature alloy 128 that is different from the first Curie temperature alloy of the core 124.

More preferably, the susceptor core 84 comprises a first Curie temperature alloy 124 and the susceptor shell 86 comprises a second Curie temperature alloy 128 wherein the second Curie temperature of the shell 86 is a lower temperature than the first Curie temperature alloy of the core 84. For example, in one preferred arrangement, the first Curie temperature alloy comprises Alloy 34 having 34% Ni and 66% Fe having a Curie temperature point about 450° F. and comprises a negligible magnetic properties above 400° F. In this same arrangement, the second Curie temperature alloy comprises Alloy 32 having 32% and 68% Fe having a Curie temperature of about 392° F. and comprises a negligible magnetic properties above 250° F. In such an arrangement, the lower Curie temperature alloy shell will act to shield the inner higher Curie temperature core so that only the shell alloy generates heat at lower temperatures.

Then, at higher temperatures, the permeability of the coaxial susceptor shell 86 having the lower Curie temperature will decrease to unity. At this lower permeability, the coaxial susceptor shell 86 becomes substantially transparent to the magnetic field generated by the conductor 80. At this point, the alloy of the susceptor core 84 then generates heat with an enhanced temperature control over the higher temperatures. As such, the coaxial susceptor 82 comprising such a core and shell configuration provides an enhanced level of temperature regulation at the lower temperatures.

In one arrangement, more than one susceptor shell may be utilized. For example, a second shell 104 as illustrated in FIG. 7 may be provided to surround the first susceptor shell 86. Similarly, the second shell 104 may comprise a Curie temperature alloy that is different than (i.e., lower than) the Curie temperature alloy of the first shell. Again, this second shell 104 will therefore act to shield the inner lower Curie temperature shell 86 and the higher Curie temperature core 84 so that only the second shell alloy 106 generates heat at the lowest of desired temperatures. Increasing the number of susceptor layers or susceptor shells provided around or surrounding the susceptor core 84 is therefore beneficial to obtaining an enhanced temperature regulation over an even wider range of operating temperatures.

The magnetic fields generated by the alternating current flowing through the helical conductor 80 wound in a Litz wire flattened helix (or solenoid) and inducing eddy currents within the array of coaxial susceptor wires 82 will now be described with reference to FIG. 6. As those of ordinary skill in the art recognize, a Litz wire is typically used to carry alternating current and may consist of many thin wire strands, individually insulated and twisted or woven together.

As can be seen as an example in FIG. 6, seven (7) coaxial susceptor wires or conductors 82 are illustrated and these coaxial conductors 82 reside between two alternating conductors of a helical conductor 80, such as the helical conductor 80 illustrated in FIG. 5. In one preferred helical conductor arrangement, the helical conductor is of unitary construction and comprises a single conductor that is wound from one end of the heating blanket to the other in a continuous, flattened helix shape. As just one example, if the helical conductor comprises a single conductor such as helical conductor 80 illustrated in FIG. 5, this single conductor 80 may make ten (10) turns per inch in the helix.

In an alternative helical conductor arrangement, the helical conductor may comprise two or more conductors forming two or more parallel circuits. Utilizing two or more conductors does not materially affect the generated magnetic field as long as each conductor carriers the same amount of current as the single conductor. With such a multiple conductor helical configuration, the controller 92 and sensor 94 may be operated to adjust and maintain this type of desired current control. One advantage of such a multiple conductor helical configuration is that it acts to reduce the voltage need to provide current from one end of the blanket to the other end of the blanket. For example, instead of having one conductor making ten (10) turns per inch in the helix, the multiple conductor configuration may have, for example, ten (10) conductors making one (1) turn per inch.

As illustrated in FIG. 6, at least one of the coaxial susceptor wires 88 comprises a susceptor core 84 and a susceptor shell 86 as illustrated in FIG. 7. The susceptor shell 86 is provided over this susceptor core 84. In addition, the coaxial susceptor wire 88 may be positioned an equal distance from both a first, lower conductor portion 80A and a second, upper conductor portion 80B. The coaxial susceptor wires are preferably electrically insulated from these conductor portions 80A,B. Initially, the application of a first alternating current $I_i$ 150 by way of a power source (FIG. 5) to the first conductor portion 80A produces an alternating magnetic field lines 96A that comprise concentric circles around the cylindrically current carrying conductor 80A. In FIG. 6, these concentric circles 96A may be illustrated as comprising a first magnetic field 96 which is illustrated as directed perpendicularly out of the paper. Similarly, the application of a second alternating current 160 (flowing in an opposite direction as the first alternation current $I_i$ 150) through the second conductor portion 80B produces an alternating magnetic field lines 96B that comprise concentric circles around the cylindrically current carrying conductor 80B.

Because of the orientation of the first and second magnetic fields 96A,B, these fields 96A,B will essentially cancel each another out on the outside of the blanket 54, below the first conductor 80A as they reside in opposite directions. Similarly, above the second or upper conductor 80B on the outside of the blanket 54, the first and second magnetic fields 96A,B will also essentially cancel one another out. In contrast, within the heating blanket matrix 78 and hence within the coaxial susceptors 82, the first and second magnetic fields 96A,B will be additive to one another since both fields are oriented substantially parallel to the axis of the susceptor wires 82. This substantially parallel combined oscillating magnetic field 96A,B will therefore generate eddy currents that travel circumferentially within the coaxial susceptors 82.

Initially, the concentration of the magnetic fields 96A and 96B results in relatively large eddy currents that are generated in the coaxial susceptor outer shell 86 of the coaxial conductors 82. The induced eddy currents result in resistive heating of the coaxial susceptor shell 86. The susceptor shell 86 conductively heats the matrix 78 and the structure 10 in thermal contact with the heating blanket 54. (FIGS. 5-8) The heating of the susceptor shell 86 continues during application of the alternating current until the magnetic material of the susceptor shell 86 approaches its Curie temperature, which again in this illustrated arrangement is lower than the Curie temperature of the susceptor core 84. Importantly, during this initial heating process, the susceptor shell 86 acts to shield the higher magnetic Curie point material of the susceptor core 84. Such shielding by the susceptor shell 86 acts to prevent the higher Curie point material of the susceptor core 84 from dominating heating at the lower temperatures.

Upon approaching the temperature where the magnetic properties of the susceptor shell 86 become negligible (i.e., when the thickness of the susceptor shell is on the order or less than the electrical skin depth), the coaxial susceptor shell 86 becomes non-magnetic. At this non-magnetic point, the magnetic fields 96A,B generated by the first conductor portion and the second conductor portion 80A,B are no longer effective on the susceptor shell 86 (which now has a mu of approximately 1). The induced eddy currents and associated resistive heating of the susceptor shell 86 therefore diminishes to a level sufficient to maintain the temperature of the susceptor shell 82 at the lower Curie temperature. Once the lower Curie temperature of the susceptor shell 82 is achieved, temperature regulation by way of the susceptor core 84 with higher Curie temperature commences.

As the susceptor shell 86 no longer generates heat and as a result of the close proximity of the susceptor core 84 of the coaxial susceptor wire 88 to the conductor 80, the concentration of the magnetic field 96B results in relatively large eddy currents in the coaxial susceptor core 84. The induced eddy currents within the susceptor core 84 result in resistive heating of the coaxial susceptor core 84. The susceptor core 84 therefore conductively heats the matrix 78 and the structure 10 in thermal contact with the heating blanket 54 (FIG. 3). The heating of the susceptor core 84 continues during application of the alternating current $I_i$ 150 and $I_{ii}$ 160 until the magnetic material of the susceptor core 84 approaches its Curie temperature, which again in this illustrated arrangement comprises a higher Curie temperature than the Curie temperature of the susceptor shell 86. Upon reaching the higher Curie temperature of the susceptor core 84, the coaxial susceptor core 84 becomes non-magnetic. At this non-magnetic point, the magnetic fields 96A,B are no longer concentrated in the susceptor core 84. The induced eddy currents and associated resistive heating of the susceptor core 84 therefore diminishes to a level sufficient to maintain the temperature of the susceptor core 84 at the higher Curie temperature.

Figure 8:
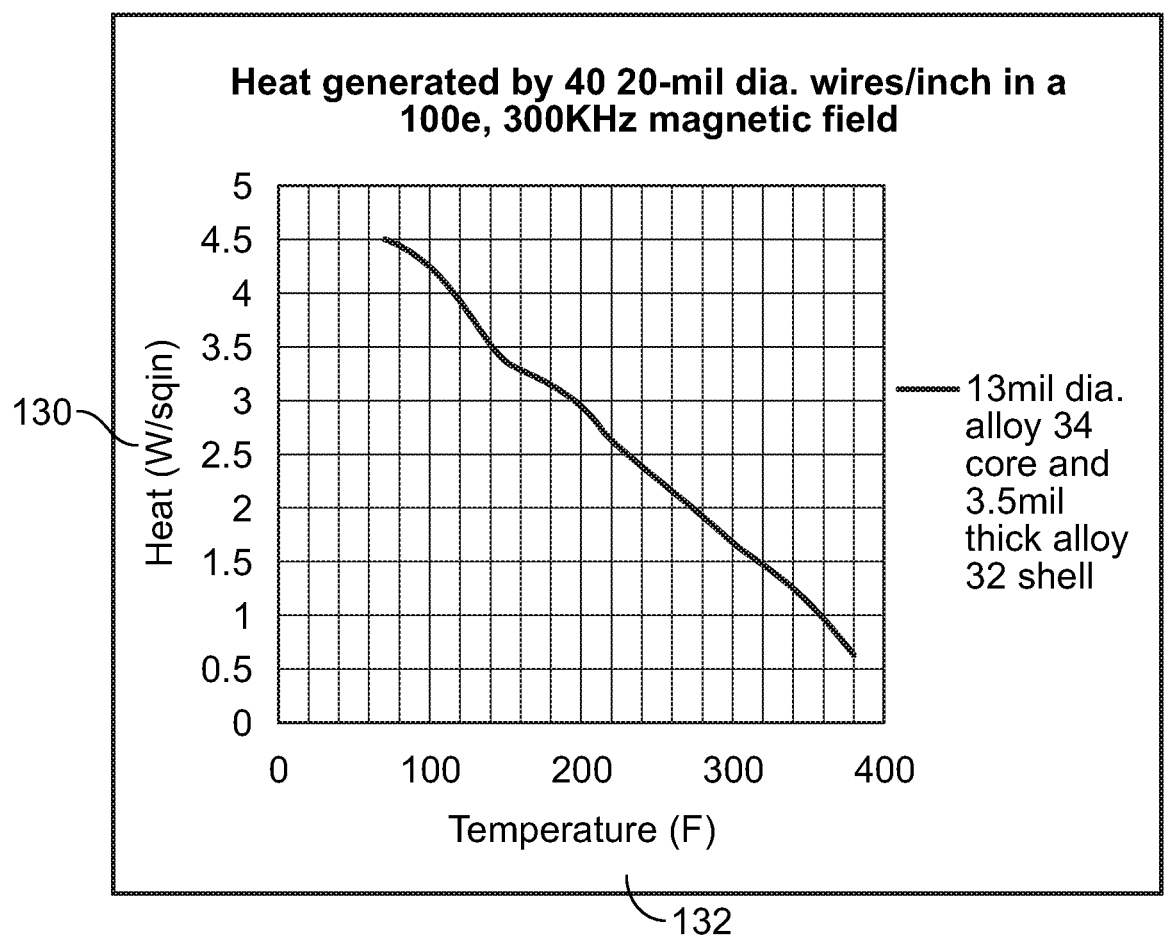
FIG. 8 is an illustration of a plot of heat output measured over temperature for an embodiment of an exemplary array of coaxial susceptor wires.

As an example of the heating of the magnetic material to the Curie temperature, FIG. 8 illustrates a plot of heat output 130 measured over temperature 132 for an exemplary heating blanket comprising an array of coaxial smart susceptors as disclosed herein. Specifically, the heating blanket may comprise an array of coaxial susceptors mounted within a conductor 80 wherein the conductor 80 comprises a Litz wire formed as a flattened helix as illustrated in FIG. 5. Specifically, to generate the data presented in this graph, the array of coaxial susceptors comprise a quantity of forty (40) 20 mil diameter/inch and were inductively heated by way of a 100e, 300 magnetic field. The coaxial susceptors comprised a susceptor core comprising a 13 mil diameter alloy 34 (34% Ni and 66% Fe) core and a 3.5 mil thick alloy 32 (32% Ni and 68% Fe) shell. As those of ordinary skill in the art will recognize, alternative core and shell configurations may also be utilized. As can be seen in FIG. 8, this coaxial susceptor arrangement provided an extended useful temperature range for such a coaxial smart susceptor including a controlled temperature range from about 60° F. to about 380° F. It should be noted that typically, in certain applications, more heat is needed to compensate for higher heat losses at higher temperatures as those temperatures illustrated in FIG. 8. In order to provide the required increase in heat, the current and therefore the magnetic fields are increased as necessary by increasing the power supply current. This increase in current will effectively shift the curve in FIG. 8 upward so as to provide a desired amount of heat while still maintaining the same negative slope curve shape while providing a greater amount of heat to cooler areas, such as those located near heat sinks. (see e.g., heat sink 28 and FIG. 1).

Figure 9:
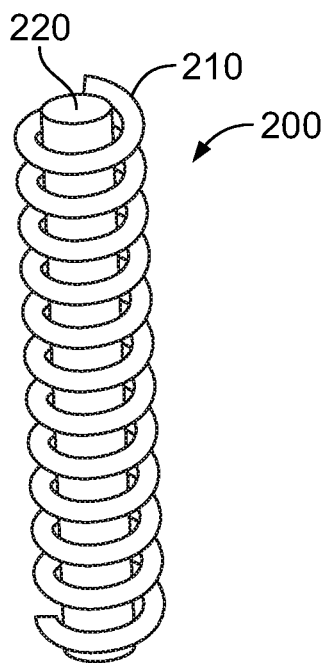
FIG. 9 is an illustration of an alternative coaxial susceptor and conductor arrangement that may be used in a heating blanket, such as the heating blanket illustrated in FIGS. 2 and 3.

FIG. 9 is an illustration of an alternative coaxial susceptor and conductor arrangement 200 that may be used in a heating blanket, such as the heating blanket 54 illustrated in FIGS. 1-3. In this illustrated alternative arrangement 200, the coaxial susceptor 210 comprises a spring shaped coaxial susceptor and is wound around a conductor 220. In one preferred arrangement, the coaxial susceptor 210 comprises a core and shell arrangement as describe and illustrated in FIG. 7, however alternative coaxial susceptor arrangements may also be utilized.

Figure 10:
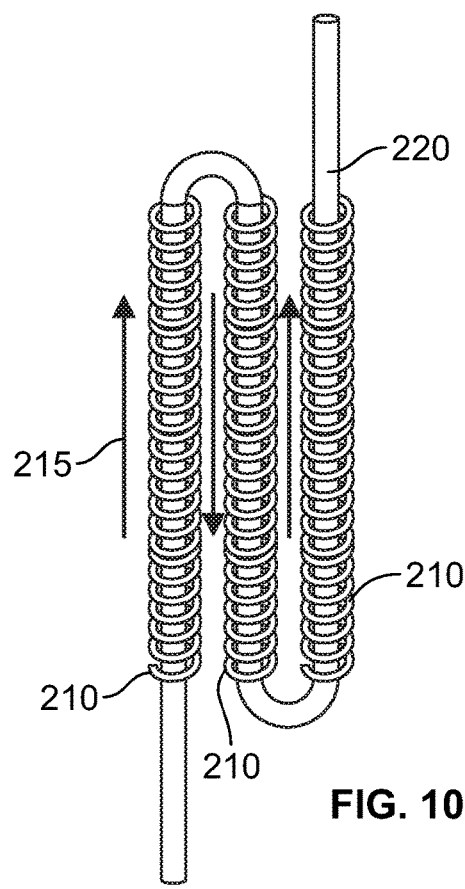
FIG. 10 is an illustration of an alternative heating blanket layout of the alternative coaxial susceptor and conductor arrangement illustrated in FIG. 10.
Figure 11:
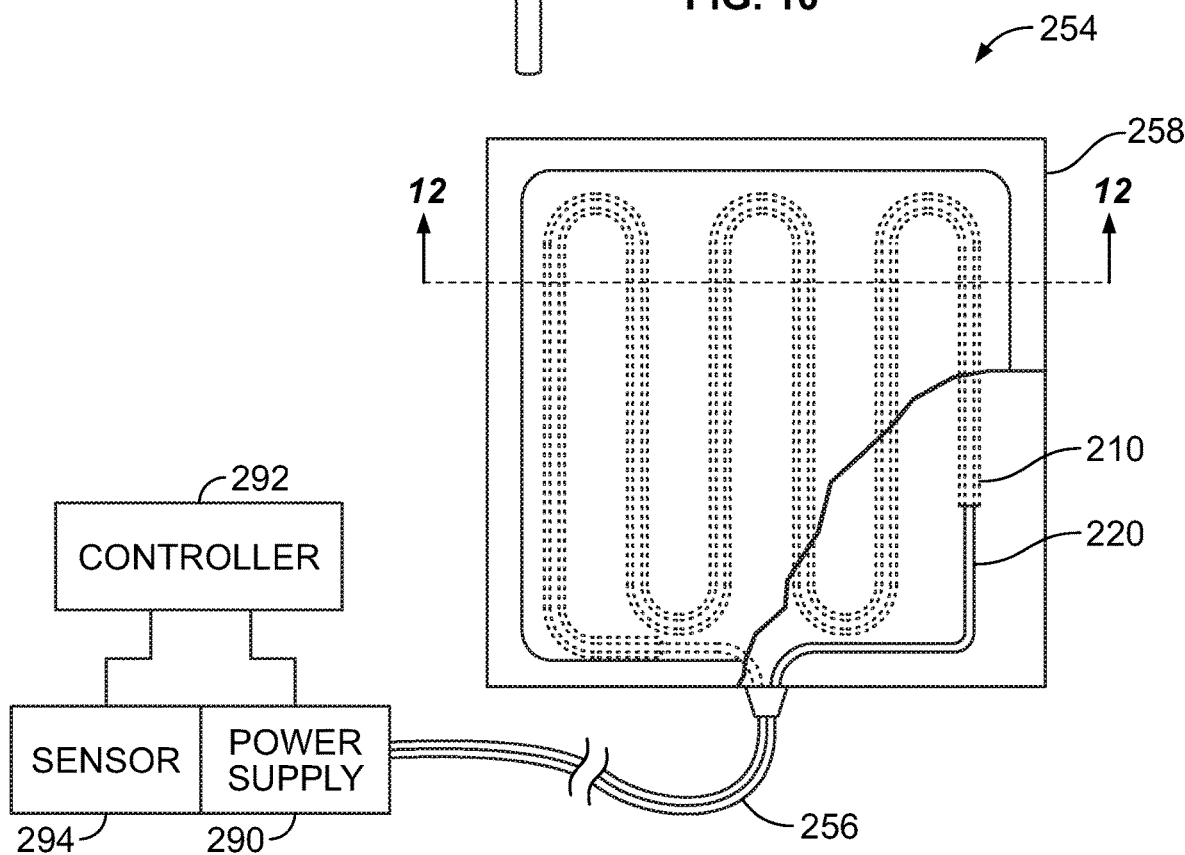
FIG. 11 is a schematic illustration of an alternative heating blanket connected to a power supply, a controller and a sensor and illustrating the coaxial susceptor and conductor arrangement illustrated in FIG. 9 housed within a housing of the heating blanket.

For example, FIG. 10 is an illustration of an alternative layout of the alternative coaxial susceptor and conductor arrangement illustrated in FIG. 9. And FIG. 11 illustrates a top view of an alternative heating blanket arrangement 254 showing the meandering pattern of the conductor 220 and the array of coaxial susceptor wires 210 within the housing 258. In one preferred arrangement, the array of coaxial susceptor wires 210 comprise spring formed coaxial wires as illustrated in FIG. 9. Such susceptor 10 may be wound around the conductor 220 such that a longitudinal axis of the array of coaxial susceptor wires 210 is substantially perpendicular to an electrical current flowing through the conductor 220 and generating a magnetic field parallel to the longitudinal axis of the susceptor wires 210. In this manner, a varying magnetic field generated by the conductor 220 induces eddy currents in the array of coaxial susceptor wires 210 as will be discussed in greater detail herein.

A power supply 290 providing alternating current electric power may be connected to the heating blanket 254 by means of the heating blanket wiring 256. The power supply 290 may be configured as a portable or fixed power supply 290 which may be connected to a conventional 60 Hz, 110 volt or 220 volt outlet. Although the power supply 290 may be connected to a conventional 60 Hz outlet, the frequency of the alternating current that is provided to the conductor 220 may preferably range from approximately 1000 Hz to approximately 400,000 Hz. The voltage provided to the conductor 220 may range from approximately 10 volts to approximately 300 volts but is preferably less than approximately 60 volts. Likewise, the frequency of the alternating current provided to the conductor 220 by the power supply is preferably between approximately 10 amps and approximately 1000 amps. In this regard, the power supply 290 may be provided in a constant-current configuration wherein the voltage across the conductor 220 may decrease as the magnetic materials within the heating blanket 254 approach the Curie temperature at which the voltage may cease to increase when the Curie temperature is reached as described in greater detail below.

Figure 12:
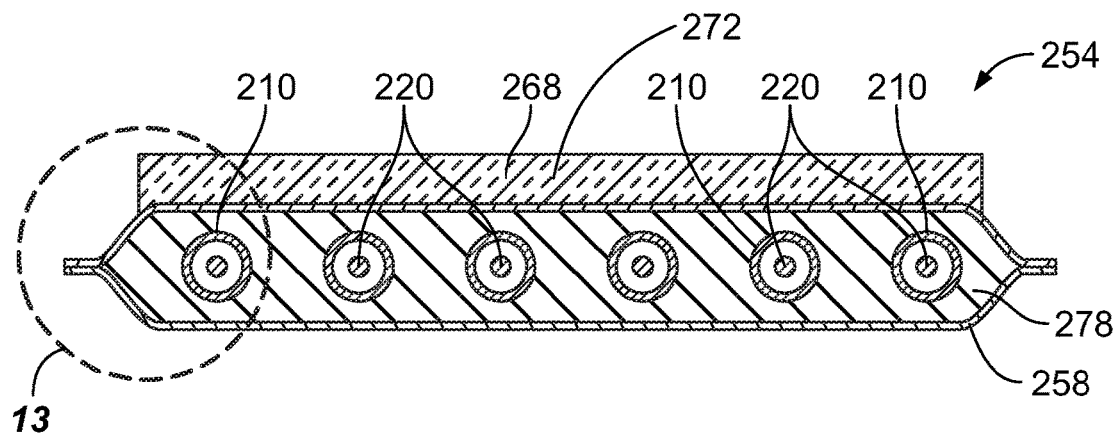
FIG. 12 is a cross-sectional illustration of the heating blanket taken along line 11-11 of FIG. 11 and illustrating the conductor provided with a coaxial susceptor spirally surrounding the conductor for induction heating thereof in response to a magnetic field generated by an alternating current applied to the conductor.
Figure 13:
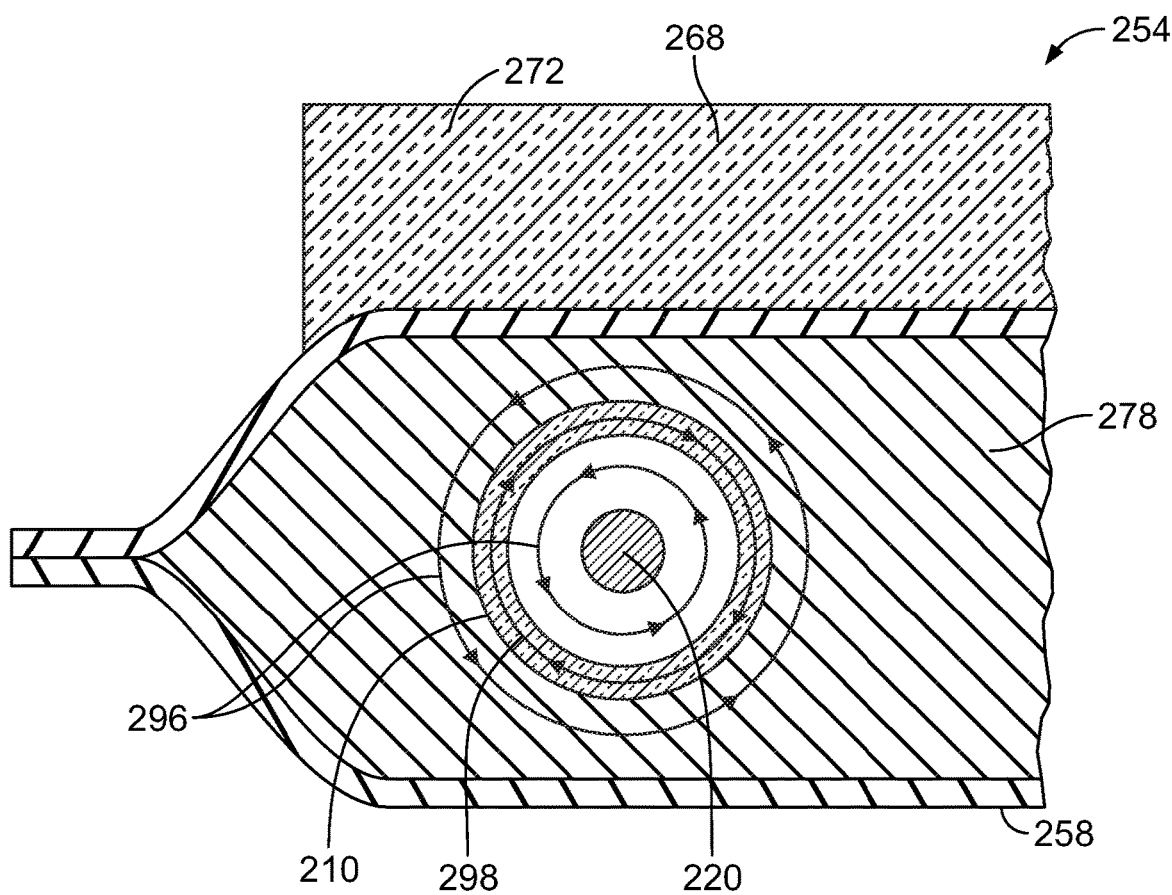
FIG. 13 is an enlarged sectional illustration of the conductor and coaxial susceptor arrangement of FIG. 12 surrounded by thermally conductive matrix and illustrating a magnetic field encircling the coaxial susceptor and generating an eddy current in the coaxial susceptor oriented in a direction opposite the direction of the magnetic field.

Referring to FIGS. 12 and 13, shown is an embodiment of the magnetic blanket 254 having a spring coaxial susceptor 210 formed of magnetic material having a Curie temperature and provided around a conductor 220. The coaxial susceptor 210 may be formed as a solid or unitary component in a cylindrical arrangement in a spiral or spring configuration around the conductor 220 in order to enhance the flexibility of the heating blanket 254. As can be seen in FIG. 13, the coaxial susceptor 210 may extend along a length of the conductor 220 within the housing 258. The coaxial susceptor 210 may be coaxially mounted relative to the conductor 220. The application of alternating current to the conductor 220 produces an alternating magnetic field 296. The magnetic field 296 is absorbed by the magnetic material from which the coaxial susceptor 210 is formed causing the coaxial susceptor 210 to be inductively heated.

More particularly and referring to FIG. 13, the flow of alternating current through the conductor 220 results in the generation of the magnetic field 296 surrounding the coaxial susceptor 210. Eddy currents 298 generated within the coaxial susceptor 210 as a result of exposure thereof to the magnetic field 296 causes inductive heating of the coaxial susceptor 210. The housing 258 may include a thermally conductive matrix 278 material such as silicone to facilitate thermal conduction of the heat generated by the coaxial susceptor 210 to the surface of the heating blanket 254. The magnetic material from which the coaxial susceptor 210 is formed preferably has a high magnetic permeability and a Curie temperature that corresponds to the desired temperature to which a structure is to be heated by the heating blanket 254. The coaxial susceptor 210 and conductor 220 are preferably sized and configured such that at temperatures below the Curie temperature of the magnetic material, the magnetic field 296 is concentrated in the coaxial susceptor 210 due to the magnetic permeability of the material.

As a result of the close proximity of the coaxial susceptor 210 to the conductor 220, the concentration of the magnetic field 296 results in relatively large eddy currents 298 in the coaxial susceptor 298. The induced eddy currents 298 result in resistive heating of the coaxial susceptor 210. The coaxial susceptor 210 conductively heats the matrix 278 and a structure 10 (FIGS. 1-3) in thermal contact with the heating blanket 254. The heating of the core and shell of coaxial susceptor 210 occurs as previously described herein with reference to FIG. 6.

The magnetic materials of the coaxial susceptor shell and core may be provided in a variety of compositions including, but not limited to, a metal, an alloy, or any other suitable material having a suitable Curie temperature. For example, the coaxial susceptor may be formed of an alloy having a composition of 32 wt. % Ni-64 wt. % Fe having a Curie temperature of approximately 390° F. The alloy may also be selected as having a composition of 34 wt. % Ni-66 wt. % Fe having a Curie temperature of approximately 450° F. However, the coaxial susceptor may be formed of a variety of other magnetic materials such as alloys which have Curie temperatures in the range of the particular application such as the range of the adhesive curing temperature or the curing temperature of the composite material from which the patch may be formed. Metals comprising the magnetic material may include iron, cobalt or nickel. Alloys from which the magnetic material may be formed may comprise a combination of the above-described metals including, but not limited to, iron, cobalt and nickel.

Likewise, the presently disclosed conductor (such as the conductor 80 illustrated in FIGS. 4-6 and the conductor 220 illustrated in FIGS. 9-12) may be formed of any suitable material having an electrical conductivity. Furthermore, the conductor is preferably formed of flexible material to facilitate the application of the heating blanket to curved surfaces. In this regard, the conductor may be formed of Litz wire or other similar wire configurations having a flexible nature and which are configured for carrying high frequency alternating current with minimal weight. The conductor material preferably possesses a relatively low electrical resistance in order to minimize unwanted and/or uncontrollable resistive heating of the conductor. The conductor may be provided as a single strand of wire of unitary construction or the conductor may be formed of braided material such as braided cable. In addition, the conductor may comprise a plurality of conductors which may be electrically connected in parallel in order to minimize the magnitude of the voltage otherwise required for relative long lengths of the conductor such as may be required for large heating blanket configurations.

Referring back to FIGS. 12 and 13, the heat blanket housing 258 may be formed of a flexible material to provide thermal conduction of heat generated by the susceptor sleeve to the structure to which the heating blanket is applied. In order to minimize environmental heat losses from the heating blanket 254, an insulation layer 268 may be included as illustrated in FIGS. 12 and 13. The insulation layer 268 may comprise insulation 272 formed of silicone or other suitable material to minimize heat loss by radiation to the environment. In addition, the insulation layer 268 may improve the safety and thermal efficiency of the heating blanket 254. As was indicated above, the housing 258 of the heating blanket 254 may be formed of any suitable high temperature material such as silicone or any other material having a suitable thermal conductivity and low electrical conductivity. Such material may include, but is not limited to, silicone, rubber and polyurethanes or any other thermally conductive material that is preferably flexible.

Referring back to FIGS. 5 and 11, the heating blankets 54,254 may include thermal sensors such as thermocouples or other suitable temperature sensing devices for monitoring heat at locations along the area of the heating blankets 54,254 in contact with the structure 10 (FIG. 3). Alternatively, the heating blankets 54,254 may include a voltage sensor 94,294 or other sensing devices connected to the power supply 90,290 as illustrated in FIGS. 5 and 11.

Referring still to FIGS. 5 and 11, sensors 94,294 may be configured to indicate the voltage level provided by power supplies 90,290, respectively. For a constant current configuration of heating blankets 54,254, the voltage may decrease as the magnetic material approaches the Curie temperature. Power supplies 90,290 may also be configured to facilitate adjustment of the frequency of the alternating current in order to alter the heating rate of the magnetic material. In this regard, power supplies 90,290 may be coupled to a respective controller 92,292 in order to facilitate adjustment of the alternating current over a predetermined range in order to facilitate the application of a heating blanket to a wide variety of structures having different heating requirements.

The presently disclosed coaxial susceptor provides a number of advantages. For example, it provides for a heating blanket that provides uniform, controlled heating of large surface areas. In addition, a proper selection of the metal or alloy in the susceptors' shell and the susceptors' core facilitates avoiding excessive heating of the work piece irrespective of the input power. By predetermining the susceptor shell and core metal alloys, improved control and temperature uniformity in the work piece facilitates consistent production of work pieces. The Curie temperature phenomenon of both the core and at least one shell (again, more than one shell may be utilized) is used to control both the temperature ranges as well as the absolute temperature of the work piece. This Curie temperature phenomenon is also utilized to obtain substantial thermal uniformity in the work piece, by matching the Curie temperature of the susceptor to the desired temperature of the induction heating operation being performed.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method for heating a structure using a susceptor array, the method comprising:
   placing the susceptor array near the structure, the susceptor array comprising
   (i) a susceptor core having a first Curie temperature,
   (ii) a susceptor shell coaxially arranged around the susceptor core, the susceptor shell having a second Curie temperature that is different from the first Curie temperature, and
   (iii) a conductor, wherein the conductor comprises a first portion and a second portion, wherein the susceptor core and the susceptor shell are between the first portion and the second portion; and
   causing a first electric current to flow through the conductor, thereby heating the structure by inducing a second electric current within the susceptor core and the susceptor shell.

2. The method of claim 1, wherein the second Curie temperature is less than the first Curie temperature, the method further comprising:
   causing the susceptor shell to reach a temperature that is equal to the second Curie temperature.

3. The method of claim 2, the method further comprising:
   after causing the susceptor shell to reach the temperature that is equal to the second Curie temperature, causing the susceptor core to reach a temperature that is equal to the first Curie temperature.

4. The method of claim 1, wherein the second Curie temperature is greater than the first Curie temperature, the method further comprising:
   causing the susceptor core to reach a temperature that is equal to the first Curie temperature.

5. The method of claim 4, the method further comprising:
   after causing the susceptor core to reach the temperature that is equal to the first Curie temperature, causing the susceptor shell to reach a temperature that is equal to the second Curie temperature.

6. The method of claim 1, wherein the susceptor core comprises a ferromagnetic material.

7. The method of claim 1, wherein the susceptor shell has a radial depth within a range of about 2 mils to 10 mils.

8. The method of claim 1, wherein the susceptor core has a diameter within a range of about 5 mils to 15 mils.

9. The method of claim 1, wherein the susceptor shell comprises an alloy comprising approximately 32% nickel.

10. The method of claim 1, wherein the susceptor core comprises an alloy comprising approximately 34% nickel.

11. The method of claim 1, wherein the susceptor shell comprises a ferromagnetic material.

12. The method of claim 1, wherein the susceptor shell comprises an alloy comprising approximately 68% iron.

13. The method of claim 12, wherein the alloy comprises approximately 32% nickel.

14. The method of claim 1, wherein the susceptor core comprises an alloy comprising approximately 66% iron.

15. The method of claim 14, wherein the alloy comprises approximately 34% nickel.

16. The method of claim 2, further comprising responsively attenuating the second electric current within the susceptor shell.

17. The method of claim 3, further comprising responsively attenuating the second electric current within the susceptor core.

18. The method of claim 4, further comprising responsively attenuating the second electric current within the susceptor core.

19. The method of claim 5, further comprising responsively attenuating the second electric current within the susceptor shell.

20. The method of claim 1, wherein the susceptor shell is a first susceptor shell, the susceptor array comprising a second susceptor shell coaxially arranged around the first susceptor shell.

* * * * *